United States Patent [19]

Hearn

[11] 4,413,182
[45] Nov. 1, 1983

[54] LEVEL DETECTOR

[75] Inventor: Daniel P. Hearn, Richardson, Tex.

[73] Assignee: Atlantic Richfield Company, Los Angeles, Calif.

[21] Appl. No.: 221,144

[22] Filed: Dec. 29, 1980

[51] Int. Cl.[3] ............................................. G01F 23/00
[52] U.S. Cl. .................................... 250/357.1; 378/52
[58] Field of Search .......................... 250/357; 378/52

[56] References Cited

U.S. PATENT DOCUMENTS 2,323,128 6/1943 Hare ..................................... 250/357
2,708,721 5/1955 Ziffer ................................... 250/357
2,714,167 7/1955 Herzog ................................. 250/357

Primary Examiner—Bruce C. Anderson
Attorney, Agent, or Firm—M. David Folzenlogen

[57] ABSTRACT

The level of liquid or solid substances in a cylindrical chamber is detected using a radioactive source and detector mounted on a vertically movable member in horizontally spaced fixed relation to each other in a manner such that the source and detector measure across a horizontal sector of 90° or more of the cylinder in which the level of the solid or liquid is to be measured. Vertical movement of the source and detector is accomplished through a drive means whose action is correlated with a recording chart on which is simultaneously plotted the amplitude of the signal produced by the detector.

1 Claim, 2 Drawing Figures

LEVEL DETECTOR

BACKGROUND OF THE INVENTION

This invention relates to determining the level of a nongaseous substance in a chamber. More particularly, this disclosure pertains to a portable level detector having a vertically movable fixed source and detector whose vertical position is correlated with a recording system.

There are many times when it is desirable to measure accurately the level of a liquid or solid substance in a chamber, for example, the level of a fire extinguishing liquid in a cylinder and the level of sand in an accumulator. In many instances, it is imperative that the measurement be made and recorded for various purposes without disrupting service lines to the chamber and without opening the chamber. It is also desirable that the measuring system be suited for use on chambers of different forms and sizes.

SUMMARY OF THE INVENTION

A detector for the level of a nongaseous substance is provided. The liquid or solid level measuring system is sensitive, accurate and well adapted to different pieces of equipment. The detector is comprised of a radioactive source and detector which are mounted in horizontally spaced fixed relation to each other and which are mounted on a movable member in a manner such that the source and detector measure across a horizontal sector of 90° or more of a cylinder in which the level of a solid or liquid is to be measured. The movable member is moved vertically in response to a drive unit. Movement of the drive unit and movable member are synchronized with a recorder chart on which is plotted the magnitude (radiation counts) of the signal measured by the detector. As long as the source and detector are held in horizontally spaced fixed relation during movement and measurement, the measuring system is accurate over a wide variety of horizontal source-detector spacings.

DETAILED DESCRIPTION OF THE PREFERRED EMBODIMENTS

Figure 1:
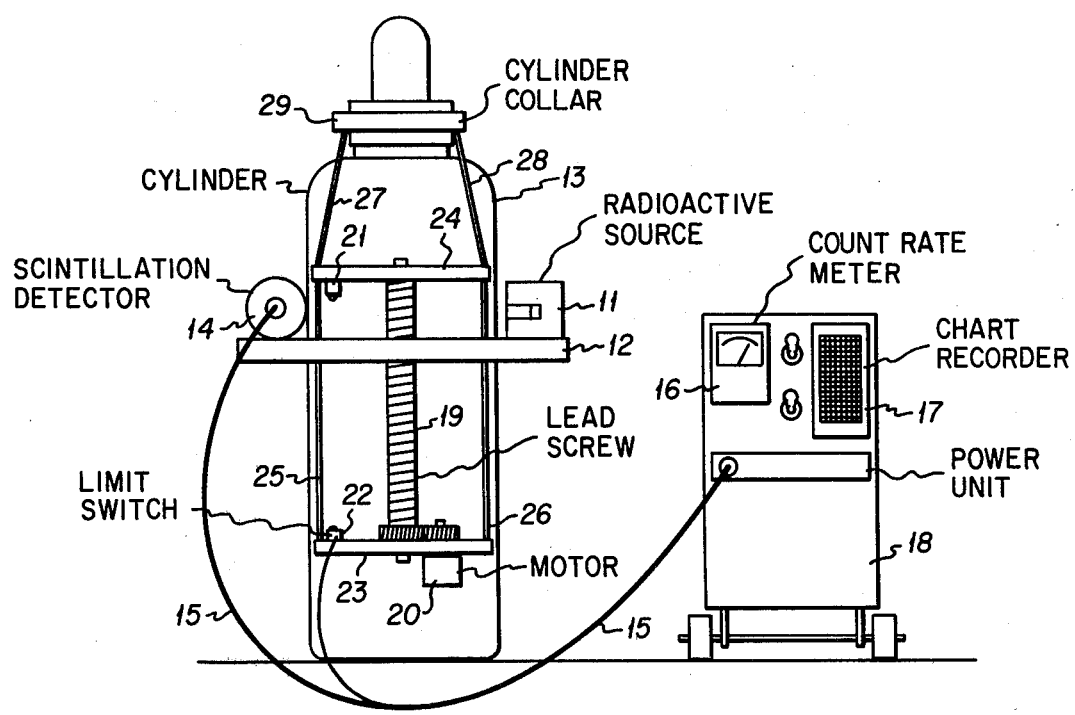
FIG. 1 is a pictorial view of a level detecting apparatus mounted on a cylindrical chamber.

Radioactive source 11 is mounted on movable member 12. The radioactive source is any sort of radioactive signal generator that emits a beam of radioactive energy whose amplitude is affected or attenuated by the presence of liquid or solid substances in cylindrical chamber 13. A common safe source of radioactivity is a 50 microcurie radium 226 source. Preferrably, the source is lead shielded on all sides but the active side. Mounted on the same movable member is scintillation detector 14 which is any sort of detector material that produces an electrical signal when the detector material is struck by the signal emitted by radioactive source 11, for example, a sodium iodide crystal is a common scintillation detector for the gamma rays emitted by radium 226. The source and detector are oriented in a way that the signal emitted by the source passes through at least a portion of the chamber walls and the cavity in the interior of the chamber and thereafter contacts the responsive detector material. In a typical fashion, the detector is adapted to produce an electrical signal whose amplitude corresponds to the strength of the radiation signal received by the detector. As shown, this electrical signal is passed through conductive conduit 15 to count rate meter 16 and to chart recorder 17 which are mounted on portable power unit 18. Movable member 12 may be formed in such a way as to expand and contract the distance between the radioactive source and detector so that the level detecting system may be better used on different size and shape chambers.

Movable member 12 is moved upward or downward by turning lead screw 19. The lead screw is turned in a typical manner by synchronous motor 20 through any sort of suitably low friction drive arrangement or gears. The drive gears can be choosen to obtain the desired scan rate of the level detector which depends on the response rate and the recorder rate. The maximum amount of upward movement of the movable member is controlled by upper limit switch 21 and downward movement is limited by lower limit switch 22.

Synchronous motor 20 and chart recorder 17 are synchronized. This also synchronizes movable member 12 with the chart. The motor and chart recorder may be powered by alternating current using for portability rechargeable batteries with an inverter. An alternating current provides a ready way of synchronizing the chart and motor through the limit switches for establishing a precise starting point and by way of the phase of the alternating current during movement. Other known means of synchronization may be used. The method selected depends on the required accuracy of the level measurement. The system shown is repeatable to 0.05 inch and accurate to one sixteeth inch depending on vertical scan rate and the angle of spacing of the detector and source.

The vertical drive system for movable member 12 may be mounted on any sort of orientated rack or member placed on or adjacent to chamber 13. As shown, lead screw 19 and drive motor 20 are mounted on lower horizontal member 23 and the lead screw extends upward to upper horizontal member 24. The horizontal members are shaped to allow the source and detector to move next to the chamber wall. The horizontal members are connected to vertical side members 25 and 26 which are suspendedly connected to collar connecting members 27 and 28. These members are in turn connected to collar 29. The collar may be removably connected to the chamber and adapted to be removably fitted around the chamber top so that there is no need to disconnect any equipment connected to the top of the chamber. If desired the collar connecting members may be removably connected to the collar and the collar left in place. Alternatively, the horizontal and vertical members may be removably connected to the collar connecting members if so desired. The collar system just described is especially suited to accurate, consistent orientation of the level detecting system on a chamber whose internal liquid or solid level is measured periodically.

Figure 2:
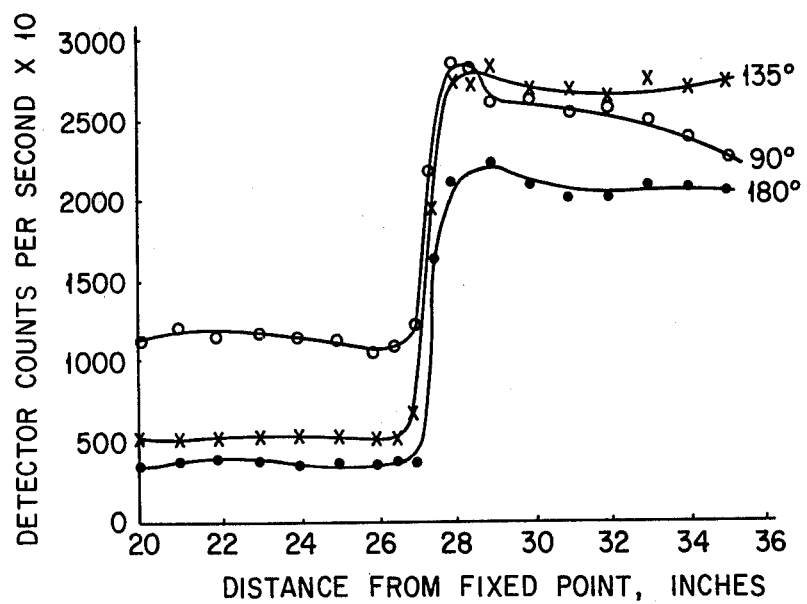
FIG. 2 shows three response curves for the source and detector when spaced horizontally at three different radial angles on the cylinder of FIG. 1.

As previously mentioned, the source and detector are readily suited to different angles of horizontal spacing. This is especially important when access to the opposite sides of the chamber is not possible, for example, where the chamber is a cylinder in a row of active cylinders lined up against the wall of a building. A detector that can accurately measure the level of nongaseous substances at angles below 180° allows liquid or solid level scans to be made when only a portion of the chamber is accessible. FIG. 2 illustrates a test of the system using a source and detector spaced 90°, 135° and 180° around a cylindrical chamber using a 50 microcurie shielded radium 226 source and a two inch diameter, two inch long, sodium iodide crystal detector. The pulses from the count rate meter were plotted on the recorder chart using ten counts for each point of the three curves. The three curves show the same liquid level in the cylinder. It will be seen that measurement across a sector as small as 90° is easily made. For the particular cylinders used in the test, a source-detector spacing angle of 135° gave the best results; but an angle of 90° was accurate enough for most purposes.

Reasonable variations and modifications are practical within the scope of this disclosure without departing from the spirit and scope of the claimed invention.

The embodiments of the invention in which an exclusive property or privilege is claimed are defined as follows:

1. An apparatus for detecting the level of a nongaseous substance in a cylindrical chamber comprising a radioactive source means and a detector means mounted on a movable means in horizontally spaced fixed relation to each other, said source means and said detector means having a source-detector spacing angle at least as great as 90°, said source of radiation being adapted to emit a signal of energy whose magnitude is attenuated by the presence of nongaseous substances, said detector means being adapted to receive said radiation signal emitted by said source means and adapted to produce an electrical signal correlating to the strength of the radiation signal received by said detector, drive means adapted to move said movable means vertically, and recorder means being synchronized with movement of said movable means and adapted to record the magnitude of the electrical output signal produced by said detector means.

* * * * *